United States Patent

Lamsfuss et al.

[19]

[11] Patent Number: 6,003,409
[45] Date of Patent: Dec. 21, 1999

[54] PLAY-FREE DEVICE FOR DRIVING A ROTARY TABLE

[75] Inventors: Harald Lamsfuss, Wipperfuerth; Norbert Kaesler, Wuppertal; Klaus Ozdyk, Luedenscheid, all of Germany

[73] Assignee: Klingelnberg Soehne GmbH, Hueckeswagen, Germany

[21] Appl. No.: 08/885,932

[22] Filed: Jun. 30, 1997

[30] Foreign Application Priority Data

Jul. 8, 1996 [DE] Germany ............ 196 27 457

[51] Int. Cl.⁶ .............. B23Q 17/00; B23F 5/16; G01B 5/00
[52] U.S. Cl. ............... 74/825; 74/815; 74/818
[58] Field of Search .......... 74/825, 815, 813 R, 74/818, 665 C, 490.1; 409/5, 10, 38

[56] References Cited

U.S. PATENT DOCUMENTS

| | | | |
|---|---|---|---|
| 3,572,175 | 3/1971 | Deprez | 74/825 |
| 3,653,282 | 4/1972 | Bouffiou et al. | 74/818 |
| 4,211,512 | 7/1980 | Zankl | 74/825 |
| 4,266,444 | 5/1981 | Anderson et al. | 74/665 C |
| 4,417,486 | 11/1983 | Tsukiji et al. . | |
| 4,499,792 | 2/1985 | Tanabe | 74/825 |
| 5,061,128 | 10/1991 | Jahr et al. . | |
| 5,810,529 | 9/1998 | Morz | 74/813 R |

FOREIGN PATENT DOCUMENTS

| | | | |
|---|---|---|---|
| 39 04 861 C1 | 4/1990 | Germany | B23F 5/12 |
| 31 16 256 C2 | 4/1991 | Germany | B23Q 5/20 |
| 43 31 042 A1 | 3/1995 | Germany | B23Q 1/25 |

OTHER PUBLICATIONS

Universal–Spiralkegelrad–Walzfrazmachinen KNC 40/KNC 60, No. 1329/D/gF Corresponding English lanuage version of Universal–Spiralkegelrad–Walzfrazmachinen KNC 40/KNC 60, No. 1329/D/gf.

*Primary Examiner*—Tamara L. Graysay
*Assistant Examiner*—David M. Fenstermacher
*Attorney, Agent, or Firm*—McCormick, Paulding & Huber LLP

[57] ABSTRACT

Two separate drive systems for driving a rotary table about an axis of rotation relative to a support member within a predeterminable angular segment. The first drive system can move the rotary table into a starting position and the second drive system is a linear one and has a play-free pre-loaded ball-and-screw spindle drive by means of which the movement of the rotary table is performed within the predeterminable angular segment. The linear drive system can be coupled and uncoupled free from play to and from the rotary table by means of a clamping system, with the linear drive system being connected to the support member and to the clamping system with two play-free joints. A rotary measuring system is mounted at the axis of table rotation to ascertain the table's current angle of rotation. Once the rotary table has been moved to the starting position, the first drive system is switched off and the second drive system is rigidly connected to the rotary table by the clamping system, and thereafter the table is moved free from play by the spindle drive powered by a servomotor under CNC control.

8 Claims, 2 Drawing Sheets

PLAY-FREE DEVICE FOR DRIVING A ROTARY TABLE

BACKGROUND OF THE INVENTION

A device of this kind is known from DE 43 31 042 A1 which will be described in more detail below.

Machine tools are often provided with a rotary table on which the workpiece to be machined is mounted. In the case of a known gear cutting machine (cf. e.g. the Klingelnberg company prospectus "Universal-Spiralkegelrad-Wälzfräsmaschinen" KNC 40/KNC 60", no. 1329/D/GF) the rotary table bears a headstock for the workpiece and is mounted on a movable slide on the machine base. The workpiece can be rotated with the workpiece headstock about a workpiece axis (usually referred to as the B axis), the rotary table can be swivelled about a workpiece swivel axis (usually referred to as the C axis) and the slide can be slid along a workpiece positioning axis (usually referred to as the Y axis).

In the case of the known gear cutting machine, these adjustable axes are CNC controlled and each is provided with its own drive (cf. the above-mentioned company prospectus, p. 6 and 7). To simplify matters, the rotary table, spindle etc. about whose axes of rotation a controlled drive movement is to take place, are simply referred to as axes of rotation. Axes of rotation with play-free drives are required in bevel gear cutting machines as well as spur gear cutting machines.

By virtue of the fact that they are able to perform modified generating movements—also non-linear movements—of the tool relative to the workpiece, these CNC controlled gear cutting machines make it possible to obtain highly specific tooth geometries.

In many cases it will be necessary to run through a reversal of the direction of rotation of individual axes of rotation during the generating process. Such "zero passages" in the gear cutting process place extremely high demands on the automatic control of the respective CNC axis of rotation and on the entire machine structure. It is necessary for the workpiece and tool to be mounted and driven free from play so that these zero passages as well as the effect of external forces or forces resulting from the work process influence the set positions and the programmed movements of workpiece and tool as little as possible.

It is impossible to obtain a drive free from play with traditional gearing systems since known tooth designs always have a certain minimum tooth clearance in connection with the reversal of rotation if they do not possess additional devices. It is true that special tooth geometries, e.g. those of bevel gears and hypoid gears, are more suitable for play-free drive than normal spur gears are (Niemann, "Maschinenelemente", volume II, P. 366, publishers: Springer Verlag 1989), however a high drive torque is necessary when flank clearance is small and the flank clearance often needs to be readjusted due to the inevitable wear that results where there is little clearance. In order to permanently ensure a play-free drive of an axis of rotation also in the case of zero passages and under the influence of operational forces, there are a number of familiar alternatives which are described e.g. in DE 43 31 042 A1.

One of these alternatives is a drive via at least one gearwheel on the axis of rotation, with the simultaneous initiation of a compensating moment. The torque acting upon the axis of rotation is superposed by a second retroactive torque which means that flank contact only ever takes place on one side. The disadvantage of this alternative is the danger of disturbing torque arising during operation and acting on the axis of rotation, which will counteract the compensating moment. This would then result in a loss of the freedom from play.

A further alternative described in DE 43 31 042 A1 is to provide a rotary table with two separate drive systems with their own source of power. The additional drive system can have a decelerating or an accelerating effect depending on the case in question, or its direction may also be reversible in order to suppress the existing drive play. The disadvantage is the low efficiency, caused by losses in conversion, transmission and slip, the complicated construction of preloads required to suppress the drive play and the high costs involved. In the case of the play-free rotary table drive of a machine tool as described in DE 43 31 042 A1, a multiple-stage transmission with several intermediate shafts is employed to avoid the above mentioned disadvantages. By means of axial shifting of at least one intermediate shaft, the flanks of the toothing of the intermediate shafts can be brought into contact in mutually opposed directions thus rendering the power transmission free from play. Multiple-stage transmissions such as this are not always practicable. Especially in the case of machine tools with CNC control, it is much simpler and more accurate to act upon the drive systems of the axes of rotation instead of attempting to influence the control system by way of the transmission.

It is an object of the present invention is to improve such a device in such as way that it allows the play-free rotary movement of a rotary table or the like about a machine axis in a predeterminable angular segment in a simple and repeatable manner without the above described disadvantages.

This object is achieved according to the present invention.

SUMMARY OF THE INVENTION

According to the present invention, a play-free device is provided for driving a rotary table or the like about an axis of rotation. The device may be employed, for example, in a gear cutting machine, where two separate drive systems are provided. The first drive system is adapted to bring the rotary table into starting position in a predeterminable angular segment. The second drive system has a linear drive to effect the actual operating movement of the rotary table within the predeterminable angular segment, and only this drive system is inherently free from play. To ascertain an actual angle of rotation of the rotary table independent of the drive system in operation at any one time, a rotary measuring system is mounted in the axis of rotation of the rotary table, and is connected to a CNC control.

Due to the fact that according to the present invention the actual drive system of the machine axis, i.e. of the rotary table or the like is only employed for the starting positioning point in a predeterminable angular segment and a linear drive is used as an additional drive system to generate the actual machining motion within the predeterminable angular segment, one avoids the above mentioned disadvantages which are associated with the prior art use of separate drive systems to suppress drive play. The device according to the present invention enables play-free rotary movement about a machine axis in any desired angular segment.

If, as according to a further embodiment of the invention, the linear drive can be coupled to the rotary table free from play by means of a clamping system it is possible in a simple manner to roughly position the rotary table with the first drive system and subsequently, after actuation of the clamping system, to move without play the rotary table within the predeterminable angular segment with the linear drive.

If, as according to a further embodiment of the invention, the linear drive is coupled rigidly to the rotary table by the clamping system and is designed such that it is able to perform radial and angular compensatory movements, use can be made of a clamping system which, due to its being of the rigid type, is of simple design but nevertheless sufficiently reliable.

If, as according to a further embodiment of the invention, two play-free pre-loaded joints are provided for the compensatory movement of the linear drive, about which or in which the linear drive is moveable, fault-free kinematic movements are possible despite the linear drive being rigidly coupled to the rotary table.

If, as according to a further embodiment of the invention, the play-free pre-loaded joints are revolute joints, in which the linear drive is linked to the clamping system or a slide upon which the rotary table is mounted, the required radial and angular compensatory movements of the linear drive are possible free from play in a simple and safe manner.

If, as according to a further embodiment of the invention, the two play-free pre-loaded joints comprise a revolute joint and a sliding joint with the linear drive being linked in the revolute joint to the clamping system and being slidable in the sliding joint in a linear direction relative to the clamping system, the necessary compensatory movements are rendered possible by means of a rotation and a translation.

If, as according to a further embodiment of the invention, the first drive system is provided with a drive motor which is rigidly attached to the rotary table and which is equipped with a pinion which meshes with a gearwheel mounted on the slide, this drive system—which is usually the only one provided but is not free from play—can be used as a simple means to roughly position the rotary table.

If, as according to a further embodiment of the invention, the linear drive is composed of a play-free pre-loaded ball-and-screw spindle mechanism and a CNC (Computer Numerical Control) controlled servomotor connected thereto, the necessary machining motion of the rotary table can be effected very accurately by means of the linear drive.

If, as according to a further embodiment of the invention, the CNC controlled servomotor can be switched to a separate drive train to position the rotary table in its starting position, the other drive motor is not required and the starting positioning can be controlled in a much more versatile manner.

Preferred embodiments of the invention are described below in greater detail with reference to the drawings.

DETAILED DESCRIPTION OF THE PREFERRED EMBODIMENTS

Figure 1:
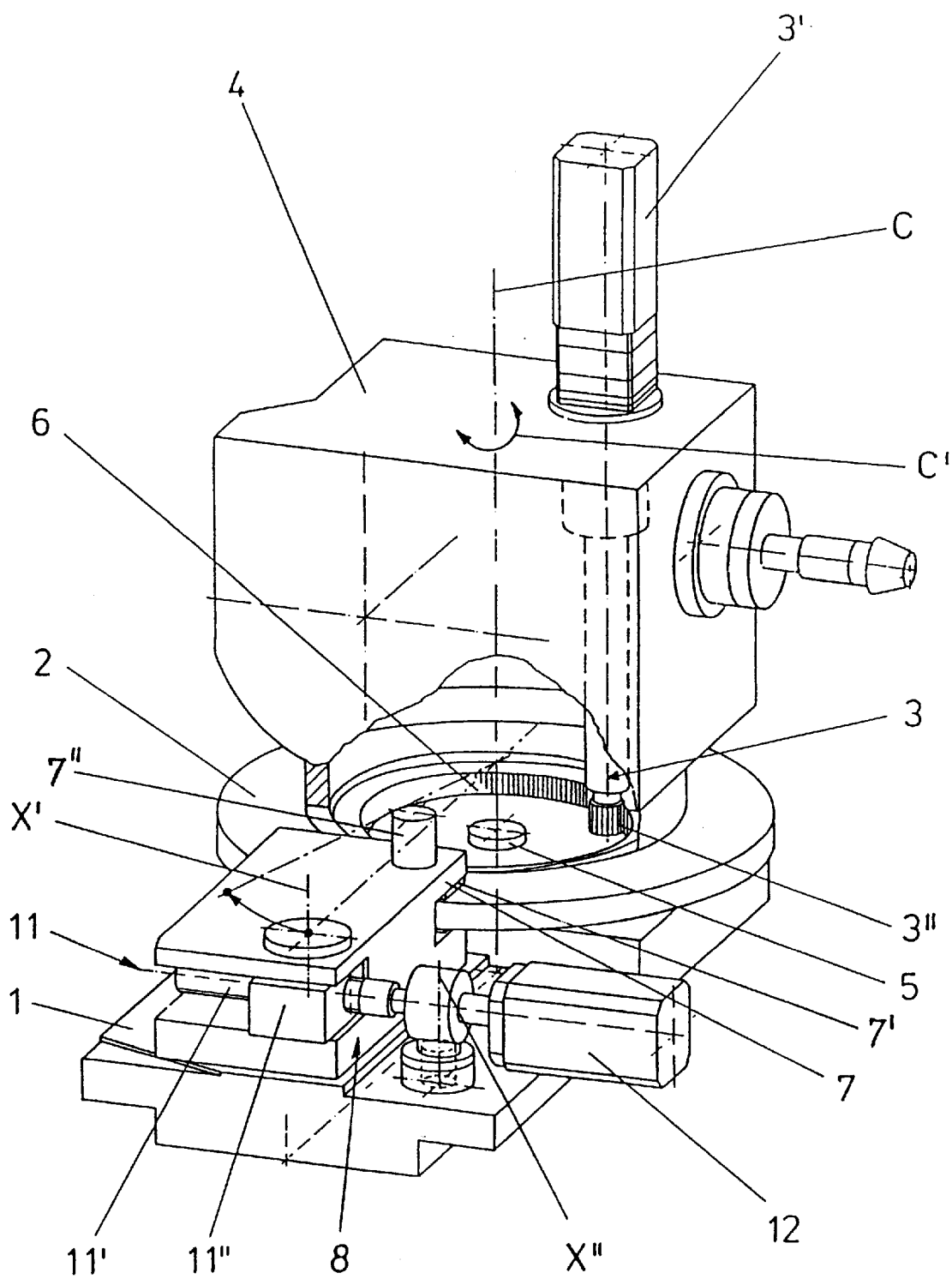
FIG. 1 shows a perspective representation of a rotary table with play-free drive and FIG. 2 shows a variant of the play-free type of drive.

FIG. 1 depicts the construction of a rotary table 2 of a CNC bevel gear cutting machine—erected on a support member shown to be a a casing or slide 1. A workpiece headstock 4 is mounted on the rotary table 2. While the gears are being cut, the workpiece headstock 4 is placed in a starting position shown in FIG. 1 by turning the rotary table 2 about its axis C relative to the slide. For this, as shown in FIG. 1 of a first embodiment of a device according to the present invention for the play-free drive of the rotary table 2 about its axis C, a first drive system 3 is provided comprising a drive motor 3'—which is anchored to the rotary table 2 and which has a pinion 3"—and a hollow wheel 6 which is mounted on the slide 1 and the toothing of which meshes with the pinion 3".

To ascertain the actual or current angle of rotation of the rotary table 2, a rotary measuring system 5 is provided in the axis C. Depending upon the machining job, the rotary table 2 must perform a CNC controlled rotary movement C' with the highest accuracy possible. This movement can assume either positive or negative directions in a cycle as dictated by the process, i.e. "zero passages" may result for the CNC axis of rotation, i.e. in the rotary movement of the CNC controlled rotary table. In order to perform the rotary movement of the rotary table 2 with sufficient precision and free from play, a second drive system 8 is provided according to the present invention in addition to the first drive system 3 of the rotary table 2 to take over the actual machining motion. After positioning the rotary table 2 in the starting position, the first drive system 3 is switched off. The second drive system 8 is coupled rigidly and free from play to the rotary table 2 by means of the clamping system 7.

It has a linear drive 11 which in this embodiment is composed of a servomotor 12, a ball-and-screw spindle mechanism 11' and a spindle nut 11" and drives the rotary table 2 by means of CNC control. The current angle of rotation of the rotary table 2 is ascertained by the rotary measuring system 5. The clamping piece 7' of the clamping system 7 can be coupled at one end to the rotary table 2 by an actuator 7" and is connected at the other end to the spindle nut 11" such that it can be swivelled about the axis of a rotary joint X'. The ball-and-screw spindle mechanism 11' is pivoted in a bracket rigidly connected to the slide 1 such that it can swivel about the axis of a rotary joint X". The complete linear drive 11 is pre-loaded so that it is free from play or clearance. Because it is rigidly coupled to the rotary table 2, the linear drive is required to carry out radial and angular compensatory movements. In the first embodiment, shown in FIG. 1 of the device according to the present invention, this problem is solved by means of the two play-free pre-loaded rotary joints X' and X".

Figure 2:
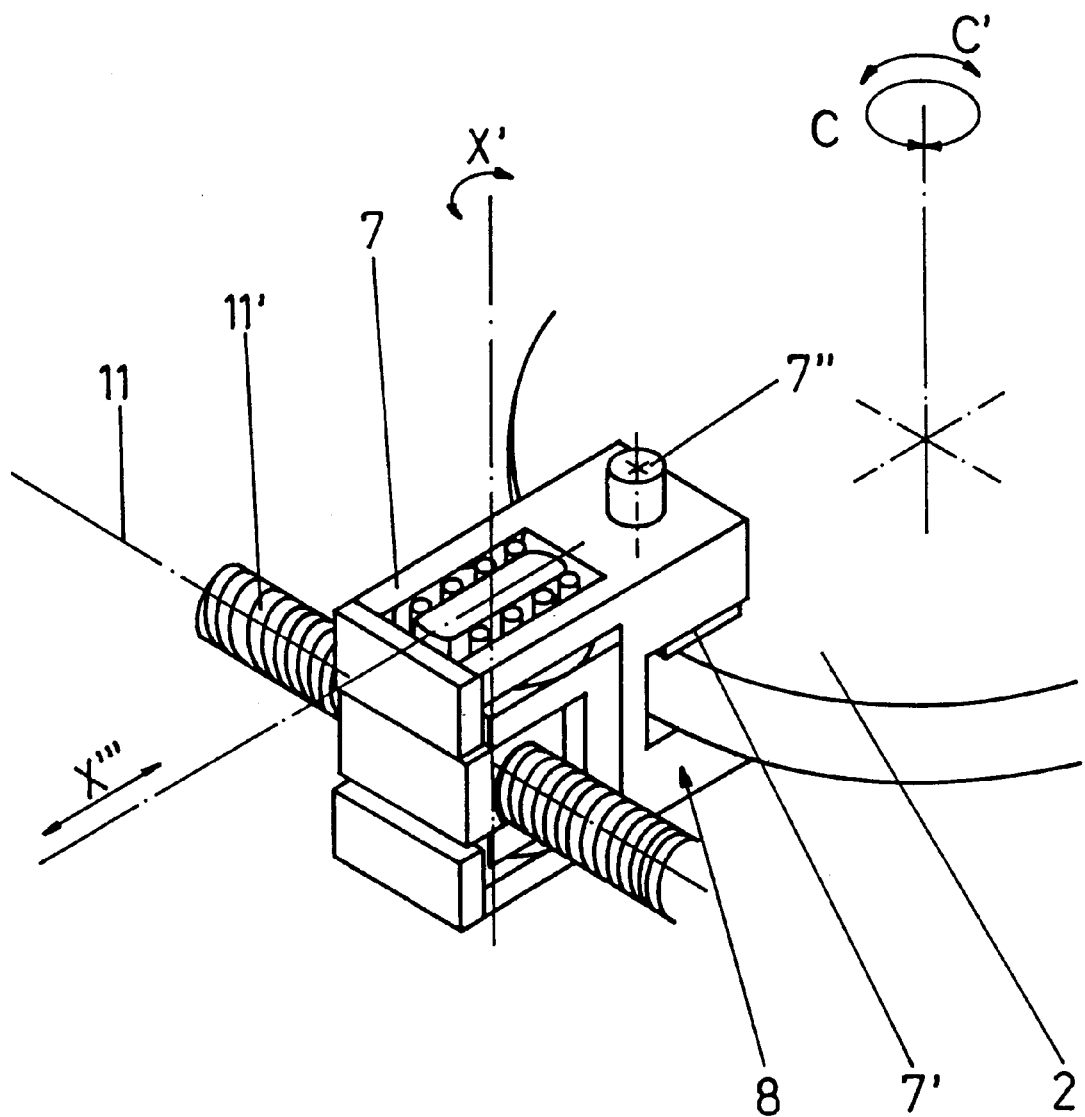

FIG. 2 shows a second embodiment of the device according to the present invention in which the necessary compensatory movements are rendered possible by a rotary joint X' and a translatory joint X''', which are also pre-loaded so that they are free from play or clearance.

Other solutions, for example switching over the CNC controlled servomotor to a separate drive train to place the rotary table in starting position and thereby making the other drive motor unnecessary, are possible but not described in greater detail.

It is claimed:

1. A device for driving a rotary table about an axis of rotation relative to a support member, and with two alternately operable separate drive systems, characterized in that:

the first drive system is non-play-free and is adapted to bring the rotary table into a starting position of a predeterminable angular segment, the second drive system has a play-free linear drive to effect movement of the rotary table within the predeterminable angular segment, and to ascertain the current angular position of the rotary table independently of the one of said first and second drive systems currently in operation, a rotary measuring system is mounted at the axis of rotation of the rotary table and is connected to a CNC control.

2. The device according to claim 1, characterized in that the linear drive is connected to the rotary table free from play by a clamping system.

3. The device according to claim 2, characterized in that the linear drive can be rigidly coupled to and uncoupled from the rotary table and is adapted to perform radial and angular compensatory movements.

4. The device according to claim 3, characterized in that the connection of the linear drive to the rotary table is effected via two play-free pre-loaded joints about which or in which the linear drive is movable.

5. The device according to claim 4, characterized in that both of the play-free pre-loaded joints are rotary joints by means of which the linear drive on one hand is linked to the clamping system and on the other hand to said support member upon which the rotary table is mounted.

6. The device according to claim 4, characterized in that the two play-free pre-loaded joints comprise a rotary joint and a translatory joint, the linear drive being on one hand fixed on the support member and on the other hand linked to the clamping system rotatable in the rotary joint and radially slidable relative to the clamping system in the translatory joint.

7. The device according to claim 1, characterized in that the first drive system has a drive motor which is rigidly connected to the rotary table and which has pinion which meshes with a gearwheel mounted on the support member.

8. The device according to claim 1, characterized in that the linear drive of the second drive system has a play-free pre-loaded ball-and-screw spindle mechanism, and in that said device includes a CNC controlled servomotor for powering said spindle mechanism.

* * * * *